(12) United States Patent
Kessler

(10) Patent No.: US 11,481,285 B1
(45) Date of Patent: Oct. 25, 2022

(54) SELECTIVE DATABASE DATA ROLLBACK

(71) Applicant: CDW LLC, Vernon Hills, IL (US)

(72) Inventor: Joseph Kessler, Grayslake, IL (US)

(73) Assignee: CDW LLC, Vernon Hills, IL (US)

( * ) Notice: Subject to any disclaimer, the term of this patent is extended or adjusted under 35 U.S.C. 154(b) by 276 days.

(21) Appl. No.: 16/688,698

(22) Filed: Nov. 19, 2019

(51) Int. Cl.
*G06F 11/14* (2006.01)
*G06F 16/23* (2019.01)
*G06F 16/22* (2019.01)

(52) U.S. Cl.
CPC ...... *G06F 11/1469* (2013.01); *G06F 16/2282* (2019.01); *G06F 16/2379* (2019.01); *G06F 2201/84* (2013.01)

(58) Field of Classification Search
CPC ............. G06F 11/1469; G06F 16/2379; G06F 16/2282
See application file for complete search history.

(56) References Cited

U.S. PATENT DOCUMENTS

| | | | | |
|---|---|---|---|---|
| 6,631,374 | B1 * | 10/2003 | Klein ................... | G06F 16/2477 707/714 |
| 9,207,930 | B2 * | 12/2015 | Srivas .................... | G06F 16/275 |
| 2015/0019909 | A1 * | 1/2015 | Griffith ............... | G06F 11/1458 714/15 |
| 2017/0169072 | A1 * | 6/2017 | Crawford ............ | G06F 11/1474 |
| 2020/0073989 | A1 * | 3/2020 | Valentin ................ | G06F 16/248 |
| 2020/0210427 | A1 * | 7/2020 | Dugan .............. | G06F 16/24542 |

OTHER PUBLICATIONS

Lubyte et al., "Extracting Ontologies form Relational Databases," (2007). Retrieved from the Internet at: URL:http://www.di.kr.org/dl2007/dl-workshops/dl2007/paper_48.pdf.
Mfoura, "Extracting Entity-Relationship Schemas from Relational Databases: A Form-Driven Approach," Proceedings of the 4th Working Conference on Reverse Engineering (1997). Retrieved from the Internet at: URL:http://www.dl.kr.org/dl2007/dl-workshops/dl2007/paper_48.pdf.
Srivastava et al., "Schema Extraction," (2010). Retrieved from the Internet at: URL:https://towardsdatascience.com/convolutional-neural-network-on-a-structured-bank-customer-data-358e6b8aa759.
Xirogiannopoulos, "Extracting and Analyzing Hidden Graphs from Relational Databases," (2017). Retrieved from the Internet at: URL:https://cgis.cs.umd.edu/sitets/default/files/scholarly_papers/Xirogiannopoulos.pdf.

* cited by examiner

*Primary Examiner* — Huawen A Peng
(74) *Attorney, Agent, or Firm* — Marshall, Gerstein & Borun LLP; Randall G. Rueth

(57) ABSTRACT

A selective database rollback method includes identifying a table, identifying a root key, storing a target rollback date, retrieving schema information including keys, ordering the table, iterating over the table, storing the current table state, obtaining a transaction journal, and reverse-applying the transaction journal to generate an output file. A method for identifying database key includes iterating over a table's columns and rows, generating similarity metrics by comparing column-wise and/or row-wise data, and comparing the generated similarity metrics to a threshold value. A server includes a processor and a memory storing instructions that, when executed by the one or more processors, cause the server to identify a table, identify a root key, store a target rollback date, retrieve schema information including keys, order the table, iterate over the table, store the current table state, obtain a transaction journal, and reverse-apply the transaction journal to generate an output file.

11 Claims, 4 Drawing Sheets

SELECTIVE DATABASE DATA ROLLBACK

FIELD OF THE DISCLOSURE

The present disclosure is generally directed to methods and systems for database data rollback and for identifying keys, more particularly, to techniques for analyzing one or more database journals to selectively revert database records, and for discovering primary keys and foreign keys.

BACKGROUND

In database technology, a rollback reverts a database to an earlier point in time. Rollbacks are used in database transactions, to avoid corrupting data in the event of a database crash, loss of power, etc. However, rollbacks are conventionally an all-or-nothing proposition—they revert an entire database, or nothing at all. Therefore, rollbacks are not useful for debugging issues that may include non-deterministic behavior. For example, many bugs are not reproducible in a quality assurance (QA) environment, and are only reproducible in a production environment. Existing debugging tools take a heavy-handed approach that requires entire portions of a database to be rolled back, which may affect production data that the developer/QA user may not want to affect. In some cases, the company cannot afford to take a production database offline for an extended period of time to troubleshoot issues that affect an entire database or table.

Further, computing a table-wide or database-wide rollback over even a relative short period of time (e.g., two days) may be computationally expensive, due to the amount of data involved. For example, a table of a company that processes a high volume of customer orders may may create hundreds of thousands of records (e.g., orders) per day, which represent many more (e.g., millions) of SQL statements.

Another issue confronting developers is that legacy database environments do not support foreign keys and/or primary keys. Older systems that lack these concepts may allow information to be added in a way that corrupts data due to lack of constraints. For example, newer systems may enforce, at the database level, that every customer must have a name. In older systems, the lack of key constraints may allow a developer to insert a customer record with NULL name value. Later, when an application attempts to access the customer name value, a NULL pointer value may be returned, causing the program to crash.

In some cases, large and complex computer applications and ecosystems are built up around legacy database systems having schemas that were created before the concepts of database keys were in wide use. In other cases, developers may have failed to think carefully about how to design schemas at the outset of a project, or may have failed to discover counter-intuitive potential keys. Conversion from legacy schemas (like AS400) to more modern ones (like SQL, etc.) is a very manually intensive process. In practice, developers often fail to properly set up schema that enforce the constraints required by the data, even with database systems that support such concepts.

BRIEF SUMMARY

In one aspect, a computer-implemented method of includes identifying one or more tables containing data to be reverted by one or both of (i) analyzing database management system schema metadata, and (ii) analyzing program parameters, identifying a root key of a root table, storing a target rollback date as a date/time to revert to, retrieving schema information for each table, including one or both of (i) one or more primary keys, and (ii) one or more foreign keys, ordering the tables in an order safe for keys, iterating over the one or more tables to be reverted, and for each table: storing the current state of the table, obtaining one or more transaction journals corresponding to the table, and generating, for each of the one or more transaction journals, a copy of the table by reverse-applying the transaction journal entry, and appending an insert statement corresponding to the copy of the table to an output file.

In another aspect, a computer-implemented method for identifying a key of a database includes for each column c1 in a first table and for each column c2 in a second table, computing a column similarity score by comparing the data type of the column c1 and the column c2. The method further includes, for each column c1 in a first table, for each column c2 in a second table, for each row value r1 in the first table, and for each row value r2 in the second table, generating a value similarity score comparing the row value r1 with the row value r2, and when the column similarity score and/or the value similarity score exceed a respective threshold, identifying the column c2 in the second table as a foreign key of the column c1 in the first table.

In yet another aspect, a server includes one or more processors; and a memory storing instructions that, when executed by the one or more processors, cause the server to: (1) identify one or more tables containing data to be reverted by one or both of (i) analyzing database management system schema metadata, and (ii) analyzing program parameters, (2) identify a root key of a root table, (3) store a target rollback date as a date/time to revert to, (4) retrieve schema information for each table, including one or both of (i) one or more primary keys, and (ii) one or more foreign keys, (5) order the tables in an order safe for keys, (6) iterate over the one or more tables to be reverted, and for each table: (7) store the current state of the table, (8) obtain one or more transaction journals corresponding to the table, and (9) generate, for each of the one or more transaction journals, a copy of the table by reverse-applying the transaction journal entry, and appending an insert statement corresponding to the copy of the table to an output file.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
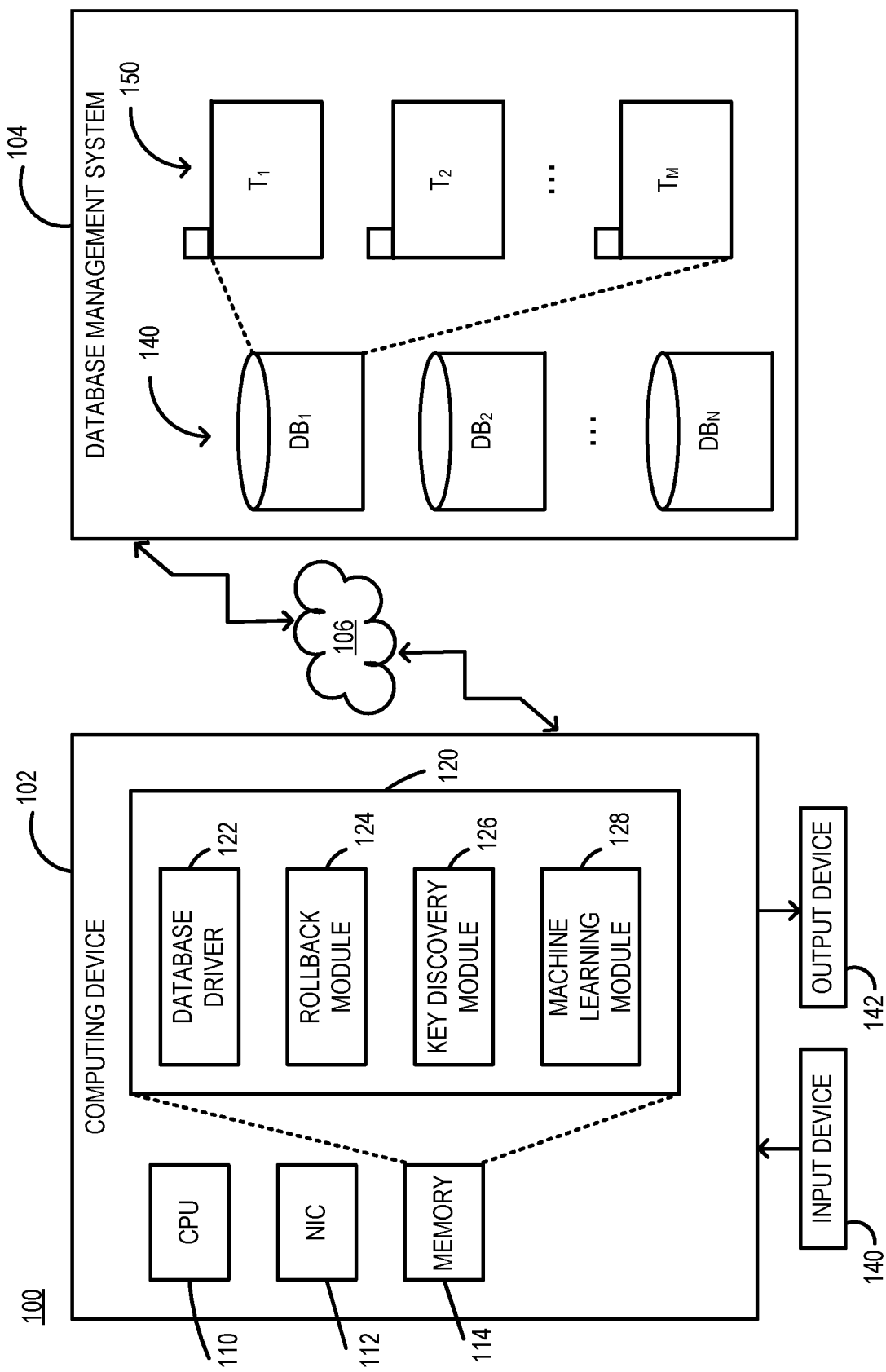
FIG. 1 depicts an exemplary computing environment in which methods and systems for performing selective database data rollback may be implemented, according to one embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, selective database data rollback, and determining keys for keyless database schemas. In an embodiment, the present techniques include methods and systems for rolling back one or more database tables to a previous state by analyzing one or more transaction journals. Specifically, the present techniques enable the rollback of one or more specific data at a database row/column level. The present techniques differ from traditional database transactions in that they provide for selective rollback.

Database journals are generated automatically by a DBMS, and are typically used for transactional rollbacks, etc. Using a traditional database journal to perform a rollback is typically performed with regard to a particular transaction in which an error may have occurred within one connection. There, the state of an entire database/table is rolled back, and the user performing the rollback has no more granular control. The present techniques are useful for for debugging and testing code. Specifically, the ability of the developer to revert a record back to the record's former state, prior to an erroneous operation being applied to the record, is very advantageous. For example, a developer will often research an issue (e.g., a bug report) and find it difficult to reproduce because the state of data (e.g., an order) prior to the erroneous operation is lost. The present techniques allow developers to "go back in time" with regard to particular data, and pursue troubleshooting angles that are otherwise not possible. However, it should be appreciated that the present techniques may also be used at the table/database level.

The present techniques include methods and systems for automatically generating related (e.g., foreign key) tables and the values therein. In particular, the present techniques may include methods and systems for analyzing data to identify one or more primary keys, based solely on the data content and metadata of database tables. Identifying one or more primary keys is useful, because legacy systems (e.g., an AS400 system) maintain very important data without foreign key constraints that are enforced, because those constraints were never identified/defined. Thus, the present techniques are advantageous for modernizing older databases.

The present techniques can discover both primary keys and relationships between tables by analyzing data. It should be appreciated that often, the present techniques advantageously discover relationships that were otherwise not known/defined by the designer of the database schema. Similarly, the present techniques can find relationships across platforms where data is split, and can discover natural keys and not always surrogate keys. The present techniques can work for many platforms that manage tabular data and have a way to connect programmatically, including Microsoft Excel and database tables (e.g., relational databases).

The present techniques assist developers updating backend systems. For example, in a company running on an AS400 database platform, the present techniques are used to analyze databases at the data level, examining what is actually there. The present techniques work for non-relational data (e.g., Excel, delimited text files, etc.). The present techniques do not assume any metadata is present (such as primary, foreign keys, or indices). The present techniques may delineate data differently than humans, and may analyze potential keys through an exhaustive search. Therefore, the present techniques may identify previously unknown/unrecognized relationships. And the present techniques may be used to analyze structured tabular data that is not part of any existing legacy application, in addition to analyzing tables that are part of an existing application or legacy project.

In some embodiments, the present techniques may be used to migrate databases from a legacy system (e.g., AS400) to a database management system (DBMS) that has supports foreign keys and primary keys. The present techniques advantageously improve data integrity and data storage. Because keys are integers, and may be used to eliminate non-key data, they may require a lot less storage space (e.g., hundreds of megabytes or more) than equivalent non-key data. Furthermore, creating indices based on integer keys may use far fewer computational resources (e.g., processor and/or memory). Programs written using DBMS supporting keys are drastically less error-prone, because problems with program logic may be caught/enforced by the DBMS. For example, when a developer writes code that attempts to violate a key constraint, the database driver may throw an exception, rather than allowing the developer to corrupt the database. Another benefit of using keys is that modifying one table may cause cascading updates to other, related tables. In general, the present techniques assist developers to follow modern software development best practices.

Exemplary Computing Environment

FIG. 1 depicts an exemplary computing environment 100 in which the techniques disclosed herein may be implemented, according to an embodiment. The environment 100 includes a client computing device 102, a database management system (DBMS) 104, and a network 106. Some embodiments may include a plurality of client computing devices 102 and/or a plurality of 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the DBMS 104, or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a database driver 122, a rollback module 124, a key discovery module 126, and a machine learning module 128.

The client computing device 102 further includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the DBMS 104, etc.).

The one or more modules 120 implement specific functionality. For example, in an embodiment, the database driver module 122 includes computer-executable instructions that, when executed, cause a computer to access one or more electronic databases. For example, the database driver module 122 may include a library of client bindings for accessing a structured query language (SQL) database (e.g., a MySQL database, an Oracle database, etc.) or another type of database (e.g., a not only SQL (NoSQL) database). A non-limiting list of NoSQL electronic databases that may be accessed by the database driver 122 bindings includes: Apache Cassandra, Apache CouchDB, Bigtable, MongoDB, and Redis. The electronic databases accessed by the bindings in the database driver 122 may reside in the client computing device 102, the DBMS 104, and/or another location accessible by the network 106. For example, the database driver 122 122 may access an electronic database via a socket, a persistent network connection, or any other suitable means. In some cases, an electronic database may reside entirely in the memory 114 (i.e., an in-memory database). The database driver 122 may load one or more databases/tables into the in-memory database. Other modules in the memory 114 may use the database driver 122 to access one or more electronic databases.

For example, the rollback module 124 may access the database driver 122 to cause one or more selective data rollbacks to occur. The rollback module 124 includes computer-executable instructions for analyzing a database journal. A database transaction log, or journal, is a chronological record of data altered by a process. The altered data may include schema events such as table creation, database renaming, etc. The altered data may also include a record of data modification (e.g., row creation, column data deleted, etc.). In general, the journal includes the information deleted/modified, so that the original values can be recreated by reading the journal. For example, a process may apply the following alterations to a database table entitled "TABLE 1":

12:01 pm—TABLE1 row created
12:10 pm—TABLE1 row added ROW1
12:30 pm—TABLE1 column changed for ROW1
1:15 pm—TABLE1 row ROW1 deleted The rollback module 124 includes instructions for recovering rows at a point in time. For example, the rollback module 124 may recover ROW1 as it existed at, say, 12:15 pm or at any other point. Furthermore, the rollback module 124 includes instructions for reverting graphs of data using table relationships (e.g., keys from TABLE1 to one or more other tables). The present techniques are advantageously contrasted to traditional transactional database rollbacks, in that the present techniques are 1) non-destructive and 2) granular. When using traditional database transaction/rollback technology, existing data in a database is overwritten/destroyed, and rollbacks take effect at the table level.

In the present techniques, rather than overwriting existing data, the rollback module 124 may generate a script (e.g., a structured query language (SQL) script) that creates a version of the data at the given time, when the script is executed. Further, the rollback module 124 operates at the row level. Using the generated SQL script, a user can create a duplicate of the way the data existed in the past. This is advantageous, because the SQL script can be run multiple times to create multiple copies of the original (former) row. A person (e.g., a QA developer) debugging, for example, a non-deterministic bug finds the ability create multiple copies very useful. Rollback embodiments are described in further detail, below.

The key discover module 126 includes computer executable instructions for connecting to one or more databases, and for analyzing tables within the one or more databases. The logic of the analyses performed by the key discovery module 126 is described in further detail, below. In some embodiments, the key discovery module 126 is implemented in C# code.

The machine learning module 128 includes computer-executable instructions for training and operating one or more machine learning model. In general, the machine learning module 128 may train one or more machine learning (ML) models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. In an embodiment, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

The DBMS 104 includes a plurality of databases 140, including a first database DB1 through database DBn, wherein n may be any positive integer. each of the plurality of database 140 includes a plurality of tables 150 from T1 through Tm, wherein m may be any positive integer. The DBMS 104 provides multiplexed access to the databases 140 and the tables 150. The DBMS 104 may be a collection of any tabular data. For example, the DBMS 104 may be implemented as a relational database management (RDBMS) such as MySQL, Oracle, etc. The DBMS may be a set of comma-separated (CSV) values, Microsoft Excel spreadsheets, etc. In particular, each of the databases 104 may correspond to a directory/file, and each of the tables 150 may correspond to a file.

The DBMS 104 may be implemented in one or more computing devices (e.g., using one or more devices such as the client computing device 102). The DBMS 104 may be implemented using one or more suitable cloud computing service (e.g., using a virtual server, or a hosted virtual database instance that provides access via database bindings but does not provide operating system level access). The server(s) implementing the DBMS 104 may include one or more processor, a NIC, a memory, etc.

Example Methods

Figure 2:
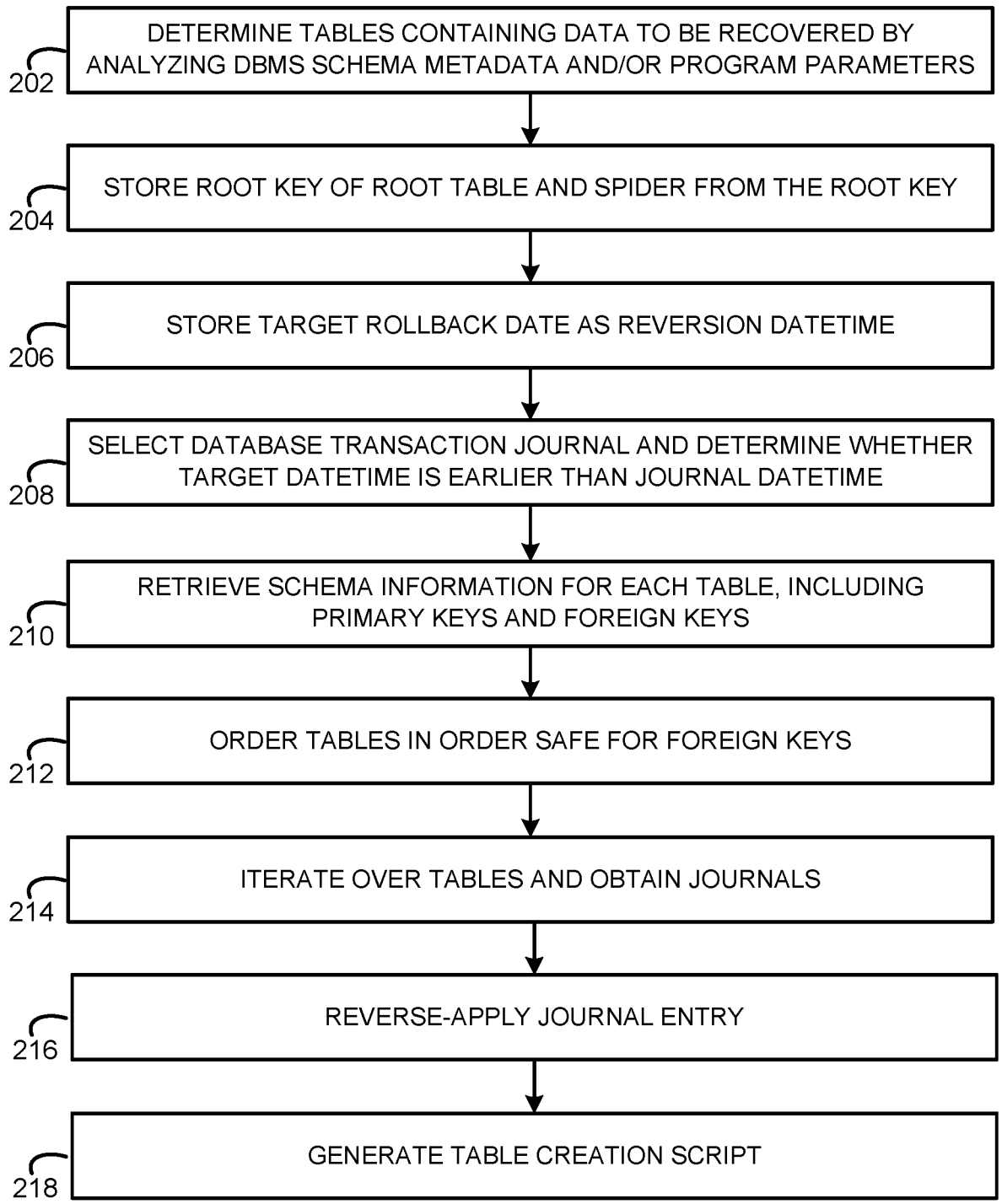
FIG. 2 depicts a flow diagram of an example rollback method, according to an embodiment.

FIG. 2 depicts a flow diagram of an example rollback method 200. The method 200 includes determining one or more tables containing data to be recovered by one or both of 1) analyzing DBMS schema metadata (e.g., by reference to a foreign key), and 2) analyzing program parameters (e.g., by reference to a configuration file or command-line interface parameters) (block 202). For example, a user may input one or more table names and respective date/time values as a parameter. The method 200 may roll each of the entered tables back to the respective time. The method 200 may be performed, for example, by the rollback module 124 of the computing device 102 of FIG. 1.

The method 200 may include storing a root key of a root table and spidering from the root key (block 204). For example, the method 200 may follow all foreign key relationships from the root table linking the root table to other tables (or the root table, in the case of a self-referential key).

The method 200 may include storing a target rollback date as a target date/time to which to revert (block 206). The target rollback date may be stored as an absolute or relative date (e.g., an epoch date).

The method 200 may include selecting one or more database transaction journal and determining whether the target date/time is earlier than the date/time of the journal (block 208). The method 200 may include, when the target date/time is earlier than the available journal, issuing a warning to the user including the earliest available date and a warning that data may be complete, and/or offering to the user the option to continue. Even if the target date is older than the oldest available information, the procedure may produce useful information in some cases.

The method 200 may include retrieving schema information for each table, including one or more primary keys and one or more foreign keys (block 210).

The method 200 may include ordering the tables in an order safe for foreign keys (block 212). For example, the method 200 may create records in a certain order to avoid foreign violations. For example, an order in an Orders table may be a foreign key to an Invoice table. In such cases, the method 200 may allow reversion of the order to a prior point in time, in addition to related records (e.g., an invoice record related to the order) in other tables (e.g., the Invoice table), but without affecting all records in the related tables (i.e., without affecting all Invoice records). In this way, records can be advantageously selectively rolled back. Given an order 1, an order 2, and an order 3; the present techniques allow the user to roll back only order 2 to where it was at a previous point in time.

The method 200 may iterate over the tables to revert, and for each one find and store (e.g., in an in-memory database stored in the memory 114 of FIG. 1) the current state of the relevant records, and obtain one or more journals for each respective table from the date/time of the target rollback date to the current time (block 214).

The method 200 may, for each of the one or more journals, reverse-apply the journal entry (block 216). For example, when the journal entry corresponds to an INSERT operation, the method 200 may perform a DELETE operation on the in-memory copy; when the journal entry corresponds to a DELETE operation, the method 200 may perform an INSERT operation on the in-memory copy; when the journal entry corresponds to an UPDATE operation, the method 200 may perform an UPDATE on the column value of the in-memory copy. It should be appreciated that some databases (e.g., databases other than relational databases) may have different semantics for the reverse-apply operation, and the present technique are amenable to being adapted for use with such non-relational use cases.

At this point, the method 200 has generated an internal (in memory) version of each table is as it existed at the target rollback date.

The method 200 may include generating a table creation script that, when executed, creates the in memory version of each table (block 218). For example, the method may include creating an output file and, for each of the tables to revert, appending an INSERT statement using data from the internal version of table to the output file. Ultimately, the resulting file (e.g., an SQL file) represents the state of the database tables at the target rollback date. In the event that a schema was modified during the interim, the method 200 may add default column values to the generated in-memory database and/or output file.

Figure 3:
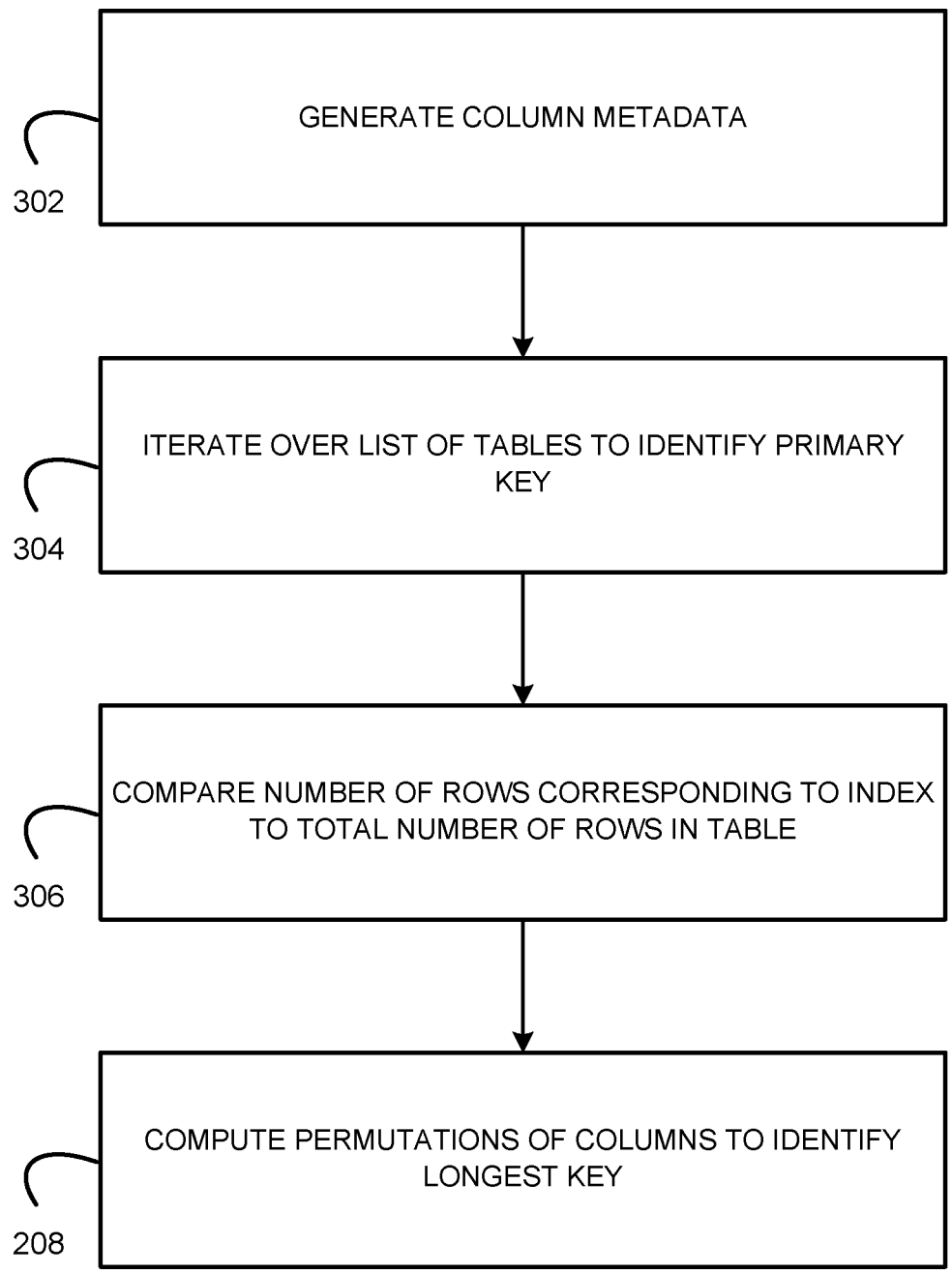
FIG. 3 depicts a flow diagram of an example method for identifying a primary key in an existing database table, according to an embodiment.

FIG. 3 depicts a flow diagram of an example method 300 for identifying a primary key in an existing database table. In some embodiments, the method 300 uses machine learning techniques. The method 300 may be performed, for example, by the key discovery module 126 of FIG. 1.

The method 300 includes generating column metadata (block 302). The column metadata includes generating a list of table names, which may be referred to as container names (e.g., in Microsoft Excel or other format like raw text). In other words, the database tables may be spreadsheets or delimited data (e.g., a comma-separated value file), in some embodiments. The column metadata may further include, for each table, column names, column descriptions, and column data types that are implicit or inferred (e.g., CHAR, INT, DECIMAL, etc.). The column metadata may further include type lengths (e.g., char 7) and any existing table indices. Reading column metadata generally does not include identifying foreign keys or primary keys, because that is the information being computed by the method. However, if the method 300 identifies any foreign key/primary key, the method may abort and generate an output displaying the existing foreign/primary key.

In some embodiments, the method 300 includes analyzing a hints file. The hints file includes explicit key determinations that a human user (e.g., a developer) provides to the method 300 to override any programmatic determinations.

The method 300 includes iterating over the list of tables to identify one or more primary keys (block 304). In an embodiment, the method 300 iterates over the list of tables in a first loop and a second loop. The list of tables may include many (e.g., thousands or more) tables. Within the second loop, the method 300 identifies a key (e.g., an order number). Identifying a key may include identifying a single-column key. To identify a single column key, the method 300 may count the total number of unique values in each column and compare each of the unique values to the total number of rows in the table. Based on the intuition that a key has a unique value for each record, the method 300 may determine that a column is a primary key match if the number of unique values in the column is equal to the number of rows in the table. In an SQL database, a "SELECT COUNT" query may be used, for example, to efficiently obtain the table row count.

When the table includes one or more indices, the method 300 may analyze whether the primary key match corresponds to one of the more indices, by counting the number of rows by comparing the number of rows corresponding to the fields in each index (e.g., SELECT COUNT(index fields)) and comparing that number to the total number of rows in the table (block 306). When the number of rows corresponding to the fields in the index equals the number of rows in the table, the method 300 identifies an index primary key match. The method 300 may identify more than one index primary key match, and the method 300 may compare the primary key match to the one or more index primary key match to determine which index is superior. For example, the index primary key match may include multiple fields, whereas the primary key match includes only one field. In that case, the index primary key match may be a superior index for the table, and the method 300 may choose the index primary key match.

Generally, the method 300 attempts to normalize the primary key by identifying the longest primary key (i.e., the primary key that includes the most columns). The method 300 may compute permutations of columns, and identify the longest key (block 308). For example, the method 300 may compute the count of each combination of columns, and sort the permutations by decreasing sum of combined counts. For each column permutation, the method 300 may count the column combination, and when the count for column equals the table row count, identify permutation primary key. The method 300 may include multiple permutation primary keys and select the one that includes the largest number of columns. The method 300 may store the match primary key(s), index primary key(s), and/or permutation primary key(s) in an internal database (e.g., one of the databases 140 of FIG. 1).

Figure 4:
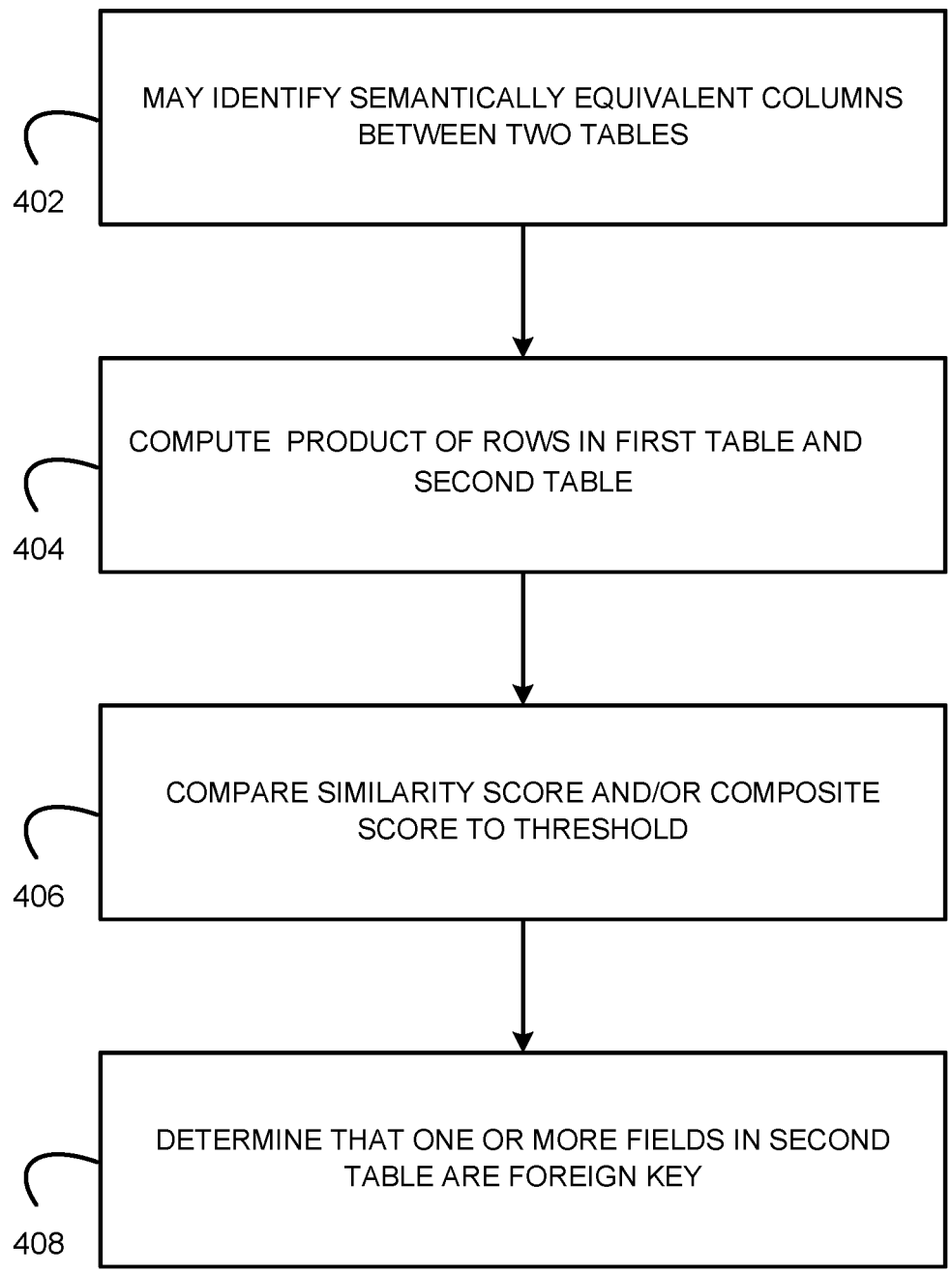
FIG. 4 depicts a flow diagram of an example method for identifying/discovering key relationships between tables, according to an embodiment.

FIG. 4 depicts a flow diagram of an example method 400 for identifying/discovering key relationships between tables (e.g., foreign keys). In some embodiments, the method 400 may use machine learning techniques.

The method 400 may identify semantically equivalent columns between two tables, to identify intentionally-created and/or natural foreign keys (block 402). In an embodiment, the method 400 iterates over the list of tables in a first loop and a second loop. For each first column in a first table, and for each second column in a second table, the method 400 computes a score based upon the similarity of the first column and the second column, wherein computing the similarity score includes comparing the data description (e.g., the data type of the first column and second column) and/or the data stored within the first column and the second column (e.g., the values of the first column and second column).

The method 400 may include computing a product (e.g., a Cartesian product) of the rows in a first table and a second table (block 404). Specifically, the method 400 may iterate over each row in first table, and for each row in the first table, iterating over each row in the second table. The method 400 may compare a first each column in each of the rows of the first table, with a second each column in each of the rows of the second table, wherein the comparison includes comparing the first each column with the second each column. For example, the comparison may be an identity/equality comparison, or a similarity metric. In effect, comparing the values of each column creates a composite score of the similarity score.

The method 400 may include comparing the similarity score and/or composite score to a threshold (block 406). When the similarity score and/or composite score exceeds a threshold, the method 400 may include determining that one or more fields in the second table are a foreign key of one or more fields in the first table (block 408). For example, given two tables with the following schema:
Table A
Name, Customer ID
Table B
Customer ID, Telephone, Email Address
wherein table A includes alphabetic names and integer customer identifiers (IDs), and that table B includes integer customer IDs, numeric telephone numbers optionally including parentheses, and email addresses. As described above, the method 400 iterates over each row in table A, and for each row, iterate over each row in table B. It should be appreciated that in the methods described herein, the iteration may be performed in a column-major or row-major way.

In some embodiments, the method 400 computes a Cartesian product of the table A and table B (A×B), wherein computing the product includes comparing the data types of each column pair and the similarity of each value pair. The product may be expressed as a matrix, wherein each coordinate of the matrix includes the similarity score and/or the composite score.

Once the comparison score matrix has been computed, the method 400 may include identifying compound keys. The method 400 identify compound keys by analyzing which combinations in the product produce the best row isolation, while not being equivalent to any primary key. For example, the method 400 may count the number of unique fields that are usable in each potential foreign key, and select as the foreign key that uses the greatest number of unique fields. In the above example, Table A and Table B may each further include an invoice number. In that case, the method 400 selects as the foreign key (Customer ID, Invoice Number) because that is the longest key.

The method 400 may count the number of records in the two or more tables to determine whether the records correspond to a foreign key relationship. For example, the respective counts determine whether the table relationship is a one-to-many relationship, a many-to-many relationship, etc.

The method 400 may include optimizing foreign key relationships between three or more tables. For example, for each foreign key between a first table and a second table, when there is a one-to-one relationship between the first table and the second table, and they both link to a parent table with a one-to-many relationship, the method 400 may remove any foreign key between the first table and the second table, as they are siblings of a common parent table.

An example of the method 400 is as follows. A first table holds customer names and customer IDs.
t1=[
["John", 101],
["Mary", 102],
["Jennifer", 103],
["Ralph", 104]]

A second table holds customer IDs and telephone numbers.
t2=[
[101, "555-1234"], [101, "555-2345"],
[102, "555-3456"],
[104, "555-4567"],
[101, "999-2344"],
[101, "999-5645"],
[103, "555-7777"]]

Pseudocode for implementing the foreign key discovery algorithm is as follows, with respect to the above two tables:

```
for c1 in t1:
    for c2 in t2:
        compare1(c1, c2)
        for r1 in c1:
            for r2 in c2:
                compare2(r1, r2)
```

Wherein compare1 compares the respective columnar data types and compare 2 compares the value of every cell (i.e., column/row combination) in t1 with every cell in t2. When executed by a processor (e.g., the processor 110 of FIG. 1), the above pseudocode would generate a list of matching keys:
r1==r2 101
r1==r2 101
r1==r2 101
r1==r2 101
r1==r2 102
r1==r2 103
r1==r2 104

The number of matches can be counted by the method 400, to determine the number of matching values in t1 and t2. In some embodiments, the methods disclosed herein may use machine learning. For example, the method 600 or the method 400 may use machine learning to match like data types. For example, a machine learning model may be trained to analyze two columns to determine whether the two columns refer to the same information. The machine learning model may accept a data type, length, and description as inputs. Such a machine learning model may be used instead of the data type scoring described above. Machine learning may be used to determine an optimal threshold score, to be used in the comparison of the above similarity score and/or composite score. The machine learning model may be, for example, a multi-layer perceptron, using a one-hot encoding for input parameters.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for performing selective database data rollback, the method comprising:
   identifying one or more tables containing data to be reverted by one or both of (i) analyzing database management system schema metadata, and (ii) analyzing program parameters,
   identifying a root key of a root table,
   storing a target rollback date as a date/time to revert to,
   retrieving schema information for each table, including one or both of (i) one or more primary keys, and (ii) one or more foreign keys,
   ordering the tables in an order safe for keys,
   iterating over the one or more tables to be reverted, and for each table:
   storing the current state of the table,
   obtaining one or more transaction journals corresponding to the table, and
   generating, for each of the one or more transaction journals, a copy of the table by reverse-applying the transaction journal entry, and appending an insert statement corresponding to the copy of the table to an output file.

2. The computer-implemented method of claim 1, further comprising:
   obtaining an oldest transaction journal, and
   when the target date/time is earlier than the date/time of the oldest transaction journal, issuing a warning to the user including the earliest available date and a warning that data may be complete, and/or offering to the user the option to continue.

3. The computer-implemented method of claim 1, wherein the copy of the table is an in-memory database.

4. The computer-implemented method of claim 1, wherein the database management system is a relational database management system.

5. The computer-implemented method of claim 1, wherein retrieving the schema information for each table, including the one or both of (i) the one or more primary keys, and (ii) the one or more foreign keys includes identifying the one or both of the one or more primary keys and the one or more foreign keys by computing a column similarity score for each respective table.

6. The computer-implemented method of claim 1, wherein obtaining the one or more transaction journals corresponding to the table includes comparing the date and time of the target rollback date to the date and time of the one or more transaction journals.

7. A server comprising:
   one or more processors; and
   a memory storing instructions that, when executed by the one or more processors, cause the server to:
   (1) identify one or more tables containing data to be reverted by one or both of (i) analyzing database management system schema metadata, and (ii) analyzing program parameters,
   (2) identify a root key of a root table,
   (3) store a target rollback date as a date/time to revert to,
   (4) retrieve schema information for each table, including one or both of (i) one or more primary keys, and (ii) one or more foreign keys,
   (5) order the tables in an order safe for keys,
   (6) iterate over the one or more tables to be reverted, and for each table:
   (7) store the current state of the table,
   (8) obtain one or more transaction journals corresponding to the table, and
   (9) generate, for each of the one or more transaction journals, a copy of the table by reverse-applying the transaction journal entry, and appending an insert statement corresponding to the copy of the table to an output file.

8. The server of claim 7, wherein the instructions further cause the server to:
   identify the one or both of (i) the one or more primary keys, and (ii) the one or more foreign keys by iterating over the columns and rows of the one or more tables to be reverted, wherein iterating over the columns and rows includes generating a column similarity score and a value similarity score.

9. The server of claim 7, wherein the instructions further cause the server to:
   execute the contents of the output file as insert statements against a temporary database stored in the database management system.

10. The server of claim 7, wherein the instructions further cause the server to:
    repeat steps 1-9 during a debugging or quality assurance programming session of a user.

11. The server of claim 7, wherein the instructions further cause the server to:
    execute the output file to initialize a copy of the root table.

* * * * *